172-141 S
12/21/8 X3 RE 32,266

United States Patent [19]
Tuggle et al.

[11] E Patent Number: Re. 32,266
[45] Reissued Date of Patent: Oct. 21, 1986

[54] LAWN EDGER

[75] Inventors: Lloyd H. Tuggle, Shreveport; Ronald C. Lloyd, Keithville; Lee R. Walker, Shreveport, all of La.

[73] Assignee: Emerson Electric Co., St. Louis, Mo.

[21] Appl. No.: 684,666

[22] Filed: Dec. 21, 1984

Related U.S. Patent Documents

Reissue of:
[64] Patent No.: 4,364,435
Issued: Dec. 21, 1982
Appl. No.: 218,560
Filed: Dec. 22, 1980

U.S. Applications:
[63] Continuation-in-part of Ser. No. 51,950, Jun. 25, 1979, Pat. No. 4,286,675.

[51] Int. Cl. ..... A01G 3/06; A01B 45/04
[52] U.S. Cl. ..... 172/15; 172/41; 30/296 R; 56/17.2
[58] Field of Search ..... 172/15, 16, 41, 42, 172/43; 56/17.2, DIG. 18, 17.1, 17.4, 12.7, 16.9, 256, 17.5; 180/19 R, 19 H; 30/276, 240, 296 R, 347

[56] References Cited

U.S. PATENT DOCUMENTS

| | | | |
|---|---|---|---|
| 2,699,605 | 1/1955 | Setter | 172/16 X |
| 2,718,742 | 9/1955 | Tangeman | 56/17.4 |
| 2,827,748 | 3/1958 | Simpson | 172/16 |
| 2,832,184 | 4/1958 | Beuerle | 56/17.2 |
| 2,888,994 | 6/1959 | Hoff | 172/41 |
| 3,006,421 | 10/1961 | Feilbach | 172/15 |
| 3,031,018 | 4/1962 | Smithers | 172/42 |
| 3,070,176 | 12/1962 | Thrasher | 172/16 |
| 3,781,991 | 1/1974 | Stretton | 30/347 |
| 4,049,059 | 9/1977 | Weibling | 172/41 |
| 4,179,805 | 12/1979 | Yamada | 172/41 |
| 4,188,719 | 2/1980 | Hoff | 56/12.7 |
| 4,286,675 | 9/1981 | Tuggle | 172/41 |

FOREIGN PATENT DOCUMENTS

| | | | |
|---|---|---|---|
| 2410422 | 8/1979 | France | 172/41 |

*Primary Examiner*—Richard J. Johnson
*Attorney, Agent, or Firm*—Hubbard, Thurman, Turner & Tucker

[57] ABSTRACT

A power operated lawn edger includes a power unit comprising an internal combustion engine having a handle portion and being connected to one end of an elongated support boom. A cutter head including a vertically disposed rotating cutter blade is mounted at the other end of the support and comprises a right angle gear drive unit which is driven by the power unit through an elongated drive shaft mounted within the support. The cutter head includes a single adjustable gauge wheel for varying the depth of cut in normal operation of the edger. The gauge wheel is mounted on a support bracket which is pivotally connected to the cutter head. The gauge wheel support bracket is releasably retained in a selected position by a manually adjustable retaining member. A laterally projecting tubular support handle is mounted on the support by a bracket member which provides for moving the handle between a folded position alongside the power unit and a working position.

26 Claims, 10 Drawing Figures

LAWN EDGER

Matter enclosed in heavy brackets [ ] appears in the original patent but forms no part of this reissue specification; matter printed in italics indicates the additions made by reissue.

*This application is a continuation-in-part of U.S. application Ser. No. 51,950 filed June 25, 1979 and now U.S. Pat. No. 4,286,675.*

BACKGROUND OF THE INVENTION

1. Field of the Invention

This invention pertains to a powered turf cutting implement useful as a lawn edger and having an elongated support with a power unit mounted at one end of the support and a vertically disposed rotating cutter blade mounted at the opposite end of the support.

2. Background Art

In the art of lawn edging and vertical turf cutting implements there has been a growing need for a lightweight and easily maneuvered power operated apparatus which is adaptable for doing routine edging work around sidewalks, patios and other surfaces contiguous with a lawn. Prior art lawn edgers are typically characterized by a cutter head mounted on a multi-wheeled undercarriage in either a tricycle configuration or dual wheels for supporting a motor or small internal combustion engine which is connected to a vertically disposed rotary cutter blade. The apparatus is usually provided with a handle in the form of elongated tubular members having handlebars at the upper distal end thereof for guiding the apparatus during cutting operations. Most known types of lawn edgers are not particularly maneuverable and are difficult to operate when edging along a curb or other narrow supporting surface.

Another deficiency of known types of powered lawn edgers concerns their inability to be easily guided in a straight line or along any surface to be edged due, in part, to the fact that all of the weight is concentrated on the support wheels and due also to multiwheeled undercarriages. If the unit tends to stray from the intended cutting path the operator quite often has to stop the unit to maneuver it or lift it back into the proper directional attitude. Wheel mounted edgers previously known are also difficult to maneuver along narrow supporting surfaces such as, for example, a narrow curbing when it is desired to edge the lawn adjacent to the curb. Moreover, known types of lawn edging and turf cutting equipment which is primarily wheel or roller supported is not adaptable for lifting onto elevated surfaces such as terraces or when trying to edge a lawn alongside steps or the like.

Another type of lawn edging apparatus which has been recently developed involves the provision of a removable support wheel or undercarriage for attachment to flexible line trimmers and the like. The conversion of flexible line trimmers to edgers has not been particularly satisfactory due to the fact that the relationship of the support handle with respect to the trimmer head is not properly oriented for guiding or use of the trimmer as an edger. Moreover, flexible line trimmers do not have the cutting capability of a rigid turf cutting type blade.

Accordingly, there has been a need for a lightweight and highly maneuverable lawn edging apparatus which is easily handled in all use situations and is adapted to track or follow the contour of a sidewalk or curb without repeatedly having to stop the unit and reorient the cutter head.

SUMMARY OF THE INVENTION

The present invention pertains to an improved lawn edging apparatus which is particularly adapted for ease of handling in performing lawn edging and other turf cutting operations and is also advantageous for use in edging around sidewalks, steps, curbs and confined areas which are not accessible with heretofore known equipment. In accordance with the present invention there is provided a powered lawn edger or the like which comprises a portable hand held power unit having an internal combustion engine adapted to be drivably connected to an elongated drive shaft supported within a tubular boom support. The power unit is mounted at one end of the support and is drivably interconnected to a vertically disposed rotary cutter blade mounted on a compact and lightweight cutter head disposed at the opposite end of the support.

The improved powered lawn edger of the present invention is also characterized by a single support or gauge wheel mounted at the end of the support at which the cutter blade is disposed. The gauge wheel is adjustably mounted on the cutter head for adjustment of the depth of cut of the rotary cutter blade for the angle of the drive mechanism which is normally experienced in operation of the unit. The provision of the single support wheel together with improved weight distribution, due to the power unit being disposed at the opposite end of the support and directly held by the operator of the edger, provides for a highly maneuverable apparatus.

It has been further discovered that an edger according to the present invention "tracks" or follows the contour of the intended cut or edging operation in a superior manner which has heretofore been unrealized. The combination of a lightweight, balanced power unit adapted to be held in the operator's hand together with a lawn edger or turf cutter attachment comprising an elongated boom connected at one end to the power unit and having a vertically disposed cutter blade at the opposite end of the boom provides for a power tool which has improved maneuverability and tracking qualities which were unexpected. Moreover, the provision of a single adjustable support wheel adjacent to the rotary cutter blade at the end of the support opposite the power unit also contributes measurably to the superior handling characteristics of the edger of the present invention.

An important aspect of the present invention pertains to an edger having an improved laterally projecting handle member mounted on an elongated support between the power unit and the cutter head and which, due to its particular disposition on the support, tends to form a barrier which minimizes the likelihood of the operator accidentally coming into contact with the rotary cutter blade. The arrangement of the power unit disposed at the end of the support opposite the cutter blade together with the laterally disposed handle for grasping by the other hand of the operator also positions the operator with respect to the edger in a manner which provides for improved maneuverability of the edger and minimizes the likelihood of accidental contact with the cutter blade. The improved laterally projecting handle portion is also advantageously adapted to be positioned longitudinally on the support to suit the balance or "feel" of the unit by different operators. Furthermore, the improved laterally projecting handle member is mounted on the support in such a way that it may be easily folded for storage and in the folded position facilitates support of the edger when it is necessary to refill the fuel tank of the power unit. The laterally foldable handle is also provided with a mechanically simple but effective releasable locking feature for retaining the handle in the operating position.

The present invention further advantageously provides a lightweight easily maneuverable powered lawn edger which is provided with a right angle bevel gear drive mechanism of a superior design which is removably mounted on the distal end of an elongated support boom. The power unit is also adapted to be removably connected to the opposite end of the support boom whereby the support boom and the drive mechanism or cutter head may be detached from the power unit so that the power unit can be used with other attachments. The power unit is preferably provided with a speed responsive clutch drive mechanism whereby, when the implement operator releases the throttle lever of the power unit, the edger cutter blade will normally decelerate and stop in a relatively short time period.

Those skilled in the art of powered lawn and turf cutting apparatus will appreciate from reading the detailed description which follows, in conjunction with viewing the drawing figures, that a superior apparatus is provided which is novel in design and construction and is provided with a number of advantages which have heretofore been unrealized and unappreciated in the art.

DESCRIPTION OF THE PREFERRED EMBODIMENT

Figure 1:
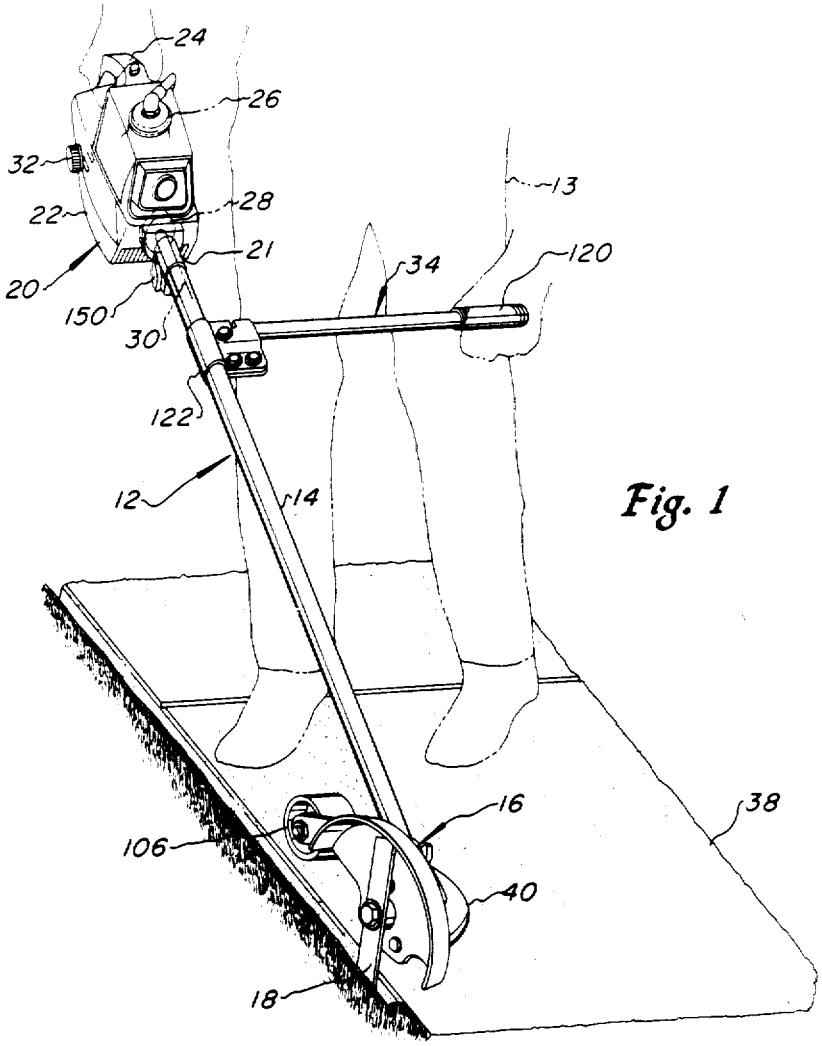
FIG. 1 is a perspective view showing the lawn edger of the present invention in a normal operating position.

Referring to FIG. 1 of the drawings, the improved lawn edger or turf cutting implement of the present invention is illustrated and generally designated by the numeral 12. The edger 12 is characterized by an elongated support 14 comprising a tubular boom of lightweight steel or aluminum tubing, for example, and having mounted at one end thereof a cutter head generally designated by the numeral 16 including drive mechanism adapted to drive a vertically disposed rotary cutter blade 18. The edger 12 also includes a power unit 20 of a superior design and which is disclosed in detail in U.S. Pat. No. 4,296,675 and assigned to the assignee of the present invention.

The power unit 20 is characterized as having a housing 22 including a longitudinally disposed handle portion 24. The power unit 20 also includes an internal combustion engine, generally designated by the numeral 26, disposed within the housing 22 and including suitable power takeoff shaft means drivably engaged with a centrifugal clutch 28. The clutch 28 is adapted to be drivably engaged with an elongated drive shaft 30 mounted within the support 14 in a suitable manner, for example, in accordance with the teaching of U.S. patent application Ser. No. 095,575 filed Nov. 19, 1979 and assigned to the assignee of the present invention. The power unit 20 also includes a fuel tank disposed within the housing 22 and having a filler neck provided with a removable cap 32 disposed on one longitudinal side of the housing, as shown in FIG. 1. The edger 12 also includes an improved laterally projecting handle generally designated by the numeral 34 in FIG. 1. The handle 34 together with the handle 24 on the power unit provides for superior handling characteristics of the edger 12 to enable an operator 13 to grasp the handles with each hand, respectively, as shown in FIG. 1, for operation of the edger to cut a narrow trench or trim the turf along a sidewalk 38.

Figure 2:
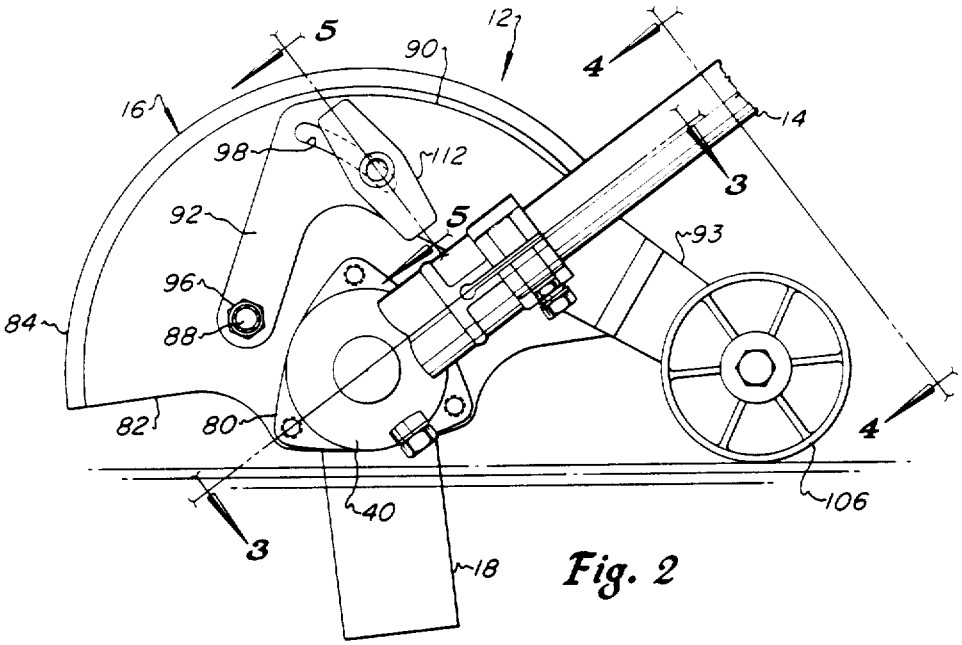
FIG. 2 is a side elevation of the cutter head and adjustable gauge wheel of the edger illustrated in FIG. 1.
Figure 3:
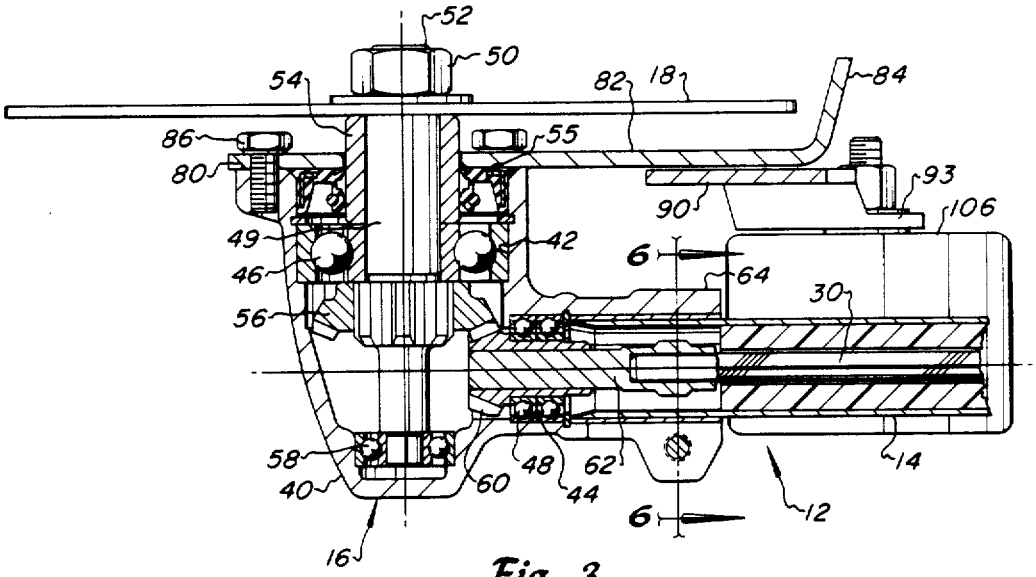
FIG. 3 is a section view taken along the line 3—3 of FIG. 2.

Referring now to FIGS. 2 and 3, the cutter head 16 includes drive mechanism comprising a housing 40 which contains a right angle bevel gear drive to rotatably driving the cutter blade 18 from the drive shaft 30 about an axis perpendicular to the axis of the drive shaft. The housing 40 includes intersecting bores including portions 42 and 44 which are respectively adapted to mount suitable antifriction bearings 46 and 48 therein, as shown in FIG. 3. The bearing 46 rotatably supports an output shaft 49 on which the cutter blade 18 is mounted and suitably retained on a threaded end portion 52 by a nut 50. A wear sleeve 54 is interposed between the cutter blade 18 and the bearing 46, as illustrated in FIG. 3, and is engageable with a resilient seal closure 55 also mounted in the housing 40. The shaft 49 has mounted thereon a bevel gear 56 disposed on the shaft between the bearing 46 and a second shaft supporting bearing 58. The bevel gear 56 is fixed to the shaft 49 by suitable interfitting splines and is meshed with a bevel pinion 60 mounted in the bearings 48. The pinion 60 is drivenly engaged with a drive shaft adapter 82 which is connected to the elongated drive shaft 30.

Figure 6:
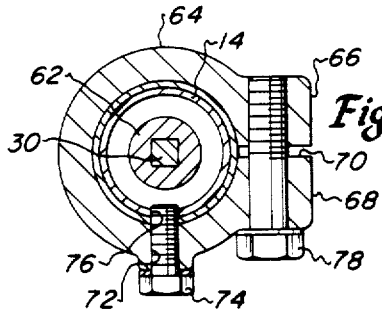
FIG. 6 is a detail transverse section view taken along the line 6—6 of FIG. 3.

Referring also to FIG. 6, the gear housing 40 is provided with a boss 64 having laterally projecting ear portions 66 and 68 separated by a slot 70 to provide clamping means for retaining the housing 40 in assembly with the distal end portion of the support 14. The boss 64 is also provided with a laterally projecting threaded bore 72 in which a retaining screw 74 is disposed and projects into a transverse bore 76 in the support boom 14 for orienting the boom with respect to the housing and serving as a secondary retainer for maintaining the housing 40 and the boom 14 in assembly. The primary clamping force for maintaining the housing 40 in assembly with the boom 14 is, however, provided by the retaining fastener 78 which is operable to draw the ears 66 and 68 toward each other to cause the boss 64 to forcibly clamp the end of the boom 14 within the bore 44. In the embodiment illustrated in FIGS. 3 and 6, the bore 44 is also provided with an adaptor sleeve as shown.

Figure 4:
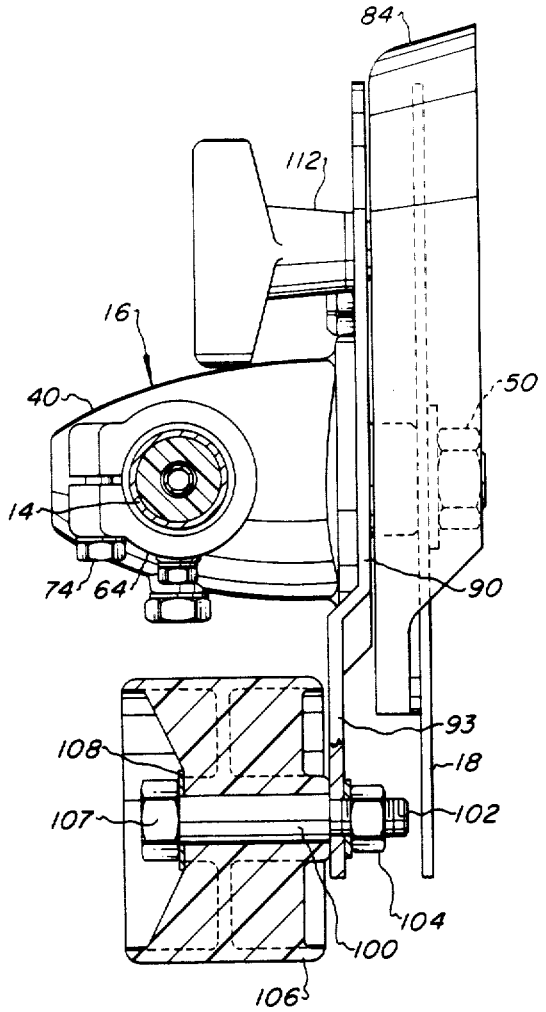
FIG. 4 is a view taken substantially from the line 4—4 of FIG. 2.

Referring further to FIGS. 2 and 3, and also FIG. 4, the housing 40 is provided with a flange 80 disposed about the output shaft 49 and comprising a mounting surface for a substantially semicircular shaped cutter blade shield 82. The shield 82 includes an axially projecting peripheral flange portion 84 which intersects and projects somewhat beyond the plane of rotation of the cutter blade 18 as indicated in FIGS. 3 and 4. The shield 82 is suitably mounted on the flange 80 by a plurality of threaded fasteners 86. The shield 82 is preferably formed of sheet steel or aluminum or shatter resistant plastic. As indicated in FIG. 2, the shield 82 includes a threaded stud 88 fixed thereon and comprising means for pivotally mounting a gauge wheel support bracket 90. The bracket 90 is characterized by a plate-like member having a transversely projecting arm portion 92 which is pivotally mounted on the stud 88 and retained thereon by a suitable lock nut 96. The bracket 90 includes an arcuate slot 98 formed therein and extending from the arm portion 92 generally toward the opposite end 93 of the bracket as shown in FIG. 2.

Referring to FIG. 4 in particular, the end 93 of the bracket 90 comprises a portion which is displaced from the plane of the main portion of the bracket 90 and is adapted to support a stub axle 100 comprising a shoulder bolt having a threaded end portion 102 which is retained on the bracket 90 by a nut 104. A single gauge wheel or roller 106 is rotatably mounted on the axle 100 and retained thereon by the head 107 and a bearing washer 108 disposed between the head and the hub of the gauge wheel. The gauge wheel 106 is provided with an axial dimension of its hub suitably proportioned to permit the wheel to be freely rotatable on the axle 100. The gauge wheel 106 is preferably formed of a durable thermoplastic and is of an axial width suitable to provide stability and support for the cutter head 16.

Figure 5:
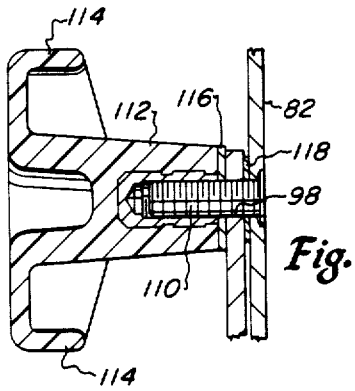
FIG. 5 is a detail section view taken substantially along the line 5—5 of FIG. 2.

Referring to FIGS. 2 and 5, in particular, the gauge wheel 106 is operable to be adjustably positioned with respect to the cutter head 16 to provide for varying the depth of cut of the blade 18 in the normal operating attitude of the cutter head 16 as held by a typical operator. The shield 82 includes a threaded stud 110 which is suitably staked to the shield as shown in FIG. 5 and projects through the slot 98 in the gauge wheel mounting bracket 90. A clamping member 112 comprising a nut having manually grippable wing portions 114 is threadedly engaged with the stud 110 and is operable to releasably clamp the bracket 90 in a selected position within the range of pivotal movement about the pivot stud 88 as provided for by the slot 98. Suitable friction washers 116 and 118 are disposed over the mounting stud 110 between the member 112 and the shield 82 as indicated in FIG. 5.

It has been determined in accordance with pursuing the present invention that the arrangement of the single gauge wheel 106, as opposed to spaced apart dual, triangular, or quadruple support wheel arrangements, that the edger 12 has superior maneuverability and is easier to steer than prior art apparatus. The gauge wheel 106 is advantageously mounted on the bracket 90 to trail behind the blade 18 in the normal direction of movement of the edger. It has also been determined that by reducing the concentration of weight at the cutter head end of the support and providing a single adjustable gauge wheel as described herein that the cutter blade 18 tends to follow the contour of a vertically disposed edge of a surface, such as the sidewalk 38 shown in FIG. 1, in a superior manner and, in fact, appears to have a natural tendency to follow along a path directly adjacent a substantially solid surface contiguous with the turf. Moreover, by providing the mounting bracket 90 arranged to position the gauge wheel 106 between the operator and the cutter blade 18 it is indicated that the maneuverability of the edger 12 is further enhanced. The arm 92 of the bracket 90 permits displacing the pivot point of the bracket sufficiently to provide a suitable clamping force on the bracket while requiring only a moderate tightening effort of the member 112.

Figure 7:
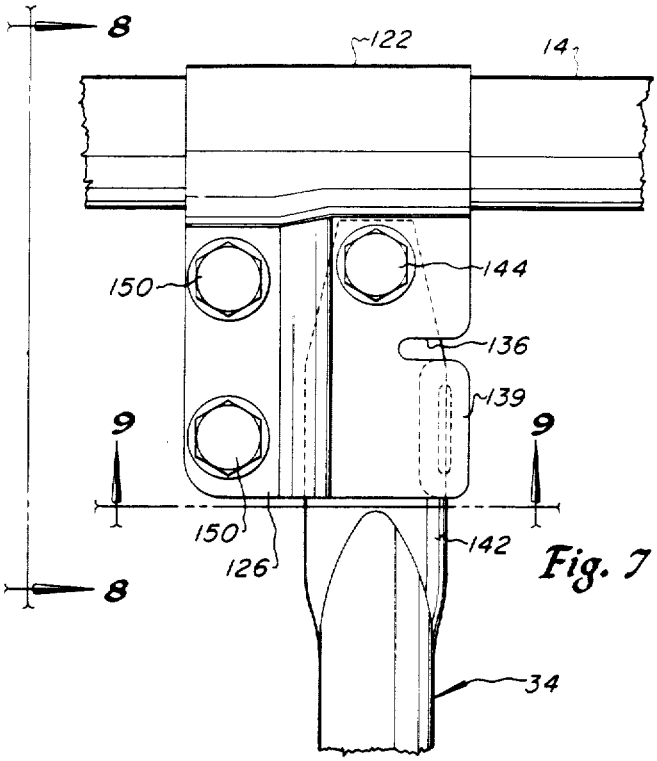
FIG. 7 is a detail plan view of the lateral handle and mounting bracket for the lawn edger of the present invention.
Figure 9:
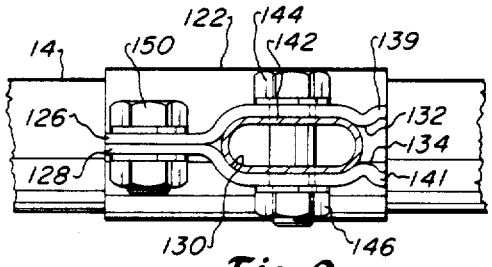
FIG. 9 is a section view taken substantially along the line 9—9 of FIG. 7.
Figure 8:
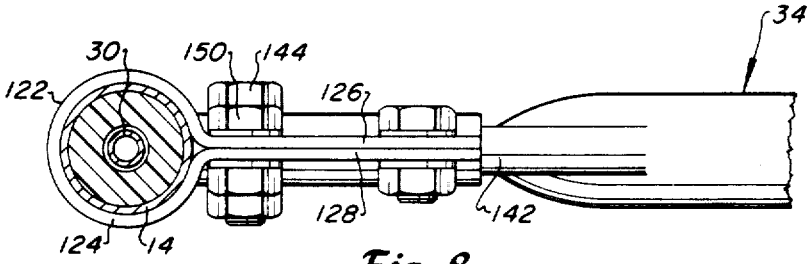
FIG. 8 is a view taken substantially along the line 8—8 of FIG. 7.

The laterally projecting handle 34 and a mounting bracket therefor will now be described in conjunction with FIGS. 1, 7, 8 and 9 of the drawings. As shown in FIG. 1, the handle 34 comprises an elongated tubular handlebar having a suitable hand grip 120 provided on the distal end thereof for grasping by the left hand of the operator 13. The handle 34 is pivotally mounted on a bracket 122 clamped to the tubular support boom 14. Referring particularly to FIGS. 7, 8 and 9, the bracket 122 preferably comprises a sheet steel stamping which is formed by suitable metal forming processes to have a cylindrical portion 124 and opposed laterally projecting parallel legs 126 and 128. The legs 126 and 128 are, along respective portions thereof, displaced with respect to each other to form an elongated slot 130 which is provided with detent means comprising spaced apart reentrant edges of the slot designated by the numerals 132 and 134 in FIG. 9. The reentrant edges 132 and 134 may be provided by suitably displacing portions of the legs 126 and 128 by suitable metal forming techniques.

As shown in FIG. 7, the portions of the legs 126 and 128 which form the slot 130 are notched at 136 so that the edges 132 and 134 are formed on cantilever integral leaf portions of the legs designated by the numerals 139 and 141.

Figure 10:
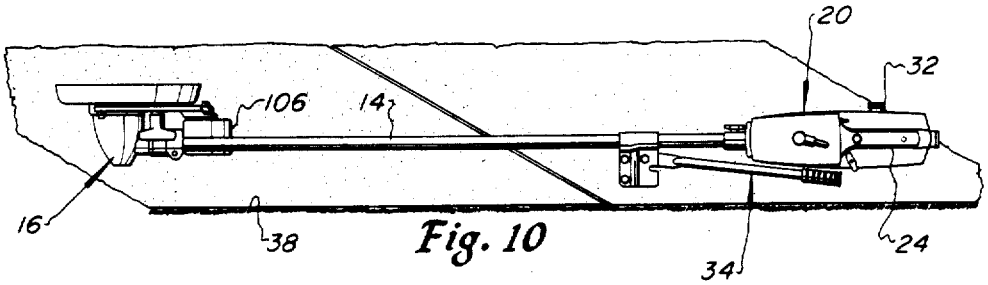
FIG. 10 is a perspective view showing the lawn edger in a typical reclined position for refilling the fuel tank of the power unit.

The handle 34, which is preferably formed of tubular steel or aluminum, for example, includes a flattened end portion 142 conforming generally to the cross sectional shape of the slot 130. The handle 34 is adapted to be pivotally connected to the bracket 122 by a shoulder screw 144 having a retaining nut 146 threadedly engaged therewith, as shown in FIG. 9. Moreover, as shown in FIGS. 7, 8 and 9, the legs 126 and 128 are suitably clamped together by spaced apart hex head bolts 150. Accordingly, the bracket 122 provides means for releasably maintaining the handle 34 in the laterally extended position, as shown in FIG. 1, but also permits the handle to be pivoted out of the slot 130 toward the power unit 20 to a folded position shown in FIG. 10. Thanks to the leaf portions 139 and 141, and the configuration of the slot 130 in the bracket 122, the handle 34 is suitably retained in its lateral working position but is prevented from being folded toward the cutter head 16. Furthermore, as shown in FIG. 10, the mounting arrangement of the handle 34 permits it to be folded into the position shown providing for laying the edger 12 on a generally horizontal surface, such as the sidewalk 38, with the fuel tank filler neck facing substantially vertically upward so that the cap 32 may be removed to provide for refueling operations on the power unit 20.

In the operation of the edger 12, the operator might prefer to adjust the depth of cut of the blade 18 by releasing forcible engagement of the bracket 90 by the clamping member 112 and positioning the bracket as desired before retightening the clamping member. Once the depth of cut had been set the operator would fold the handle 34 into the extended position and, upon starting the engine 26, place the cutter blade in its intended cutting position adjacent the edge of the sidewalk 38. The clutch 28 would normally be in a disengaged condition at idle speed of the engine 26 whereby the blade 18 would not be rotating. The power unit 20 includes a digitally actuated throttle lever, not shown, on the handle 24 for convenient operation to run the engine 36 through its speed range. Accordingly, when the operator releases his grasp on the handle 24 the engine 26 normally, if running, operates at a speed which is insufficient to engage the clutch 28.

When the operator positions the edger 12 in the working position illustrated in FIG. 1, the handle 34 projects generally horizontally and provides a substantial barrier to prevent the operator from moving forward toward the cutter head 16 or pulling the edger back toward himself sufficiently, in normal operation, to come into contact with the cutter blade 18. Moreover, the arrangement of the horizontally disposed laterally projecting handle 34 together with the longitudinally extending handle 24 on the power unit 20, and the single adjustable gauge wheel 106 provides for a well balanced and easily maneuvered implement which has proven to possess superior handling and operating characteristics as compared with prior art apparatus including the types discussed herein.

The edger 12 is mechanically simple and rugged and is advantageously provided with a compact right angle speed reducing bevel gear drive mechanism for the vertically disposed rotary blade 18. If desired, the support 14 together with the cutter head 16 may be detached as a unit from the power unit 20. Referring to FIG. 1, the power unit 20 includes a boss 21 disposed on the housing 22 and which is similar to the boss 64 on the housing 40. The boss 21 is provided with a clamping screw designated by the numeral 150 to provide for releasably clamping the support 14 to the power unit 20 in a manner similar to the way in which the support is secured to the housing 40. Alternatively, the support boom 14 could be secured to the housing 20 in accordance with the arrangement disclosed in the aforementioned U.S. patent application Ser. No. 051,950.

Although the present invention has been described with reference to a preferred embodiment, it will be appreciated by those skilled in the art that additions, substitutions, and modifications to the structure disclosed and claimed herein may be carried out to achieve the objects of the invention and fall within the scope and spirit of the appended claims.

What is claimed is:

1. A power operated lawn edger comprising:

an elongated support;

a power unit including a prime mover mounted on one end of said support;

a cutter head including drive mechanism disposed at the opposite end of said support and drivably connected to rotary cutting blade means adapted for rotation in a substantially vertical cutting plane;

means drivingly interconnecting said power unit and said cutting blade means;

a first handle portion disposed on said power unit and extending along the top of said power unit generally longitudinally with respect to the longitudinal axis of said support;

an elongated tubular handlebar mounted on said support between said ends of said support and projecting generally horizontally from said support, said first handle portion and said handlebar being adapted to be grasped, respectively by an operator's hands for guiding said edger in the operation thereof; and a single gauge roller mounted at said opposite end of said support and adapted to partially support said edger to control the cutting depth of said cutting blade means in edging turf along a substantially predetermined cutting path.

2. The invention set forth in claim 1 wherein:

said gauge roller includes a support member pivotally mounted on said cutter head and including a distal end portion projecting rearwardly from said cutter head and supporting said gauge roller and means for releasably locking said roller support member in one of a plurality of selected positions to control the cutting depth of said cutting blade means.

3. The invention set forth in claim 2 wherein:

said means for releasably locking said roller support member includes a threaded pin mounted on a cutting blade shield disposed on said cutting head, said pin projecting through an elongated slot in said roller support member, and a manually operable clamping member adapted to be engaged with said pin and operable to be rotated to releasably clamp said roller support member between a surface on said clamping member and said shield.

4. The invention set forth in claim 3 wherein:

said roller support member is adapted to mount said roller on a distal end portion of said roller support member disposed generally between said blade means and said one end of said support.

5. The invention set forth in claim 3 wherein:

said roller support member includes a main body portion, a laterally projecting arm portion having a distal end pivotally connected to said cutter head, a slot formed in said roller support member, and means engageable with said roller support member and spaced from said distal end of said arm portion for releasably retaining said roller support member in a selected fixed position with respect to said cutter head.

6. A portable power operated implement comprising:

a support including an elongated boom portion;

a power unit including a prime mover mounted on one end of said support;

a cutter head including drive mechanism disposed at the opposite end of said support and drivably connected to substantially vertically disposed rotary cutting blade means;

drive shaft means drivingly interconnecting said power unit and said blade means;

adjustable surface engaging roller means mounted on said implement at said opposite end of said support and adapted to partially support said implement to control the cutting depth of said blade means;

handle means spaced apart on said support and adapted to be grasped by an operator in the normal position of operating said implement in such a way that said operator is remote from said blade means, said handle means including a first handle portion disposed on said power unit, and a second handle portion including an elongated handlebar mounted on said boom portion; and a bracket adapted to be clamped to said support in a selected position along said support and including means for pivotally mounting said handlebar on said bracket whereby said handlebar may be moved between a working position projecting substantially laterally with respect to said support to a folded position toward said power unit while said handlebar is prevented from being pivoted toward said opposite end of said support;

said bracket including portions spaced apart to form a slot adapted to receive said handlebar and to releasably lock said handlebar in said laterally projecting position;

said bracket portions forming reentrant edges of said slot defining therebetween an opening having a width less than the cross sectional thickness of said handlebar, said edges being engageable with said handlebar in response to the pivotal movement of said handlebar to provide for yieldably deflecting said bracket portions away from each other to permit said handlebar to be pivoted into and out of said laterally extending position.

7. A portable power operated implement comprising:

an elongated support;

a power unit connected to one end of said support;

a cutter head mounted at the opposite end of said support and including substantially vertically disposed rotary cutter blade means;

handle means spaced apart on said implement and adapted to be grasped by an operator for said implement, said handle means including a handlebar disposed on said support between said power unit and said cutter head, and a bracket for connecting said handlebar to said support for movement between a folded position and a position projecting laterally in a generally horizontal direction in a normal operating position of said cutter head, said bracket comprising a platelike member formed to have a generally cylindrical portion disposed around said support, a pair of opposed legs projecting from said cylindrical portion and including portions forming said slot and cantilever leaf portions defining reentrant edges of said slot for releasably retaining said handlebar in said laterally projecting position of said handlebar.

8. A portable power operated implement comprising:

a support including an elongated boom portion;

a power unit including a prime mover mounted on one end of said support;

a cutter head including drive mechanism disposed at the opposite end of said support and drivably connected to rotary cutting blade means;

handle means spaced apart on said support and adapted to be grasped by an operator in the normal position of operating said implement in such a way that said operator is remote from said blade means, said handle means including a first handle portion disposed on said power unit, and a second handle portion including an elongated handlebar mounted on said boom portion; and a bracket adapted to be mounted on said support in a selected position along said support and including means for pivotally mounting said handlebar on said bracket whereby said handlebar may be moved between a working position projecting substantially laterally with respect to said support to a folded position toward said power unit while said handlebar is prevented from being pivoted toward said opposite end of said support;

said bracket including portions spaced apart to form a slot adapted to receive said handlebar and to releasably lock said handlebar in said laterally projecting position.

9. A portable power operated lawn edger comprising:

a support including an elongated boom portion;

a power unit including a prime mover mounted on one end of said support;

a cutter head including drive mechanism disposed at the opposite end of said support and drivably connected to substantially vertically disposed rotary cutting blade means;

drive shaft means drivingly interconnecting said power unit and said blade means;

adjustable surface engaging roller means mounted on said edger at said opposite end of said support and adapted to partially support said edger to control the cutting depth of said blade means;

handle means spaced apart on said support and adapted to be grasped by an operator in the normal position of operating said edger in such a way that said operator is remote from said blade means, said handle means including a first handle portion disposed on said power unit, and a second handle portion including an elongated handlebar mounted on said boom portion; and a bracket adapted to be mounted on said support and including means for pivotally mounting said handlebar on said bracket whereby said handlebar may be moved between a working position projecting substantially laterally with respect to said support to a folded position extending generally alongside said support toward said power unit while said handlebar is prevented from being pivoted toward said opposite end of said support, said bracket including means for releasably locking said handlebar in said laterally projecting position.

10. The invention set forth in claim 9 wherein:

said implement includes a roller support member disposed at said opposite end of said support, said roller means being rotatably mounted on said roller support member, pivot means adapted to support said roller support member at said opposite end of said support, and means for releasably locking said roller support member in one of a plurality of selected positions to control the cutting depth of said blade means.

11. The invention set forth in claim 10 wherein:

said cutter head includes a gear housing mounted on said opposite end of said support and a cutting blade shield disposed partially about said cutting blade means.

12. The invention set forth in claim 11 wherein:

said means for releasably locking said roller support member includes a threaded pin mounted on said shield and projecting through an elongated slot in said support member, and a manually operable clamping member adapted to be engaged with said pin and operable to be rotated to releasably clamp said support member between a surface on said clamping member and said shield.

13. The invention set forth in claim 10 wherein:

said roller support member is adapted to mount said roller means on a distal end portion of said roller support member disposed generally between said blade means and said one end of said support.

14. The invention set forth in claim 13 wherein:

said roller support member includes a main body portion, a laterally projecting arm portion having a distal end pivotally connected to said cutter head, a slot formed in said roller support member, and means engageable with said roller support member and spaced from said distal end of said arm portion for releasably retaining said roller support member in a selected fixed position with respect to said cutter head.

15. A portable power operated implement comprising:

a support including an elongated boom portion;

a power unit including a prime mover mounted on one end of said support;

a cutter head including drive mechanism disposed at the opposite end of said support and drivably connected to rotary cutting means;

drive shaft means drivingly interconnecting said power unit and said blade means;

handle means spaced apart on said support and adapted to be grasped by an operator in the normal position of operating said implement in such a way that said operator is remote from said blade means, said handle means including a first handle portion disposed on said power unit, and a second handle portion including an elongated handlebar mounted on said boom portion;

means for pivotally mounting said handlebar on said boom portion whereby said handlebar may be moved between a working position projecting substantially laterally with respect to said support to a folded position extending generally alongside said support toward said power unit; and said power unit includes a housing for an internal combustion engine, a fuel tank, and a fuel filler neck cap disposed on a longitudinal side of said housing, and said handlebar is adapted to be folded toward said housing along a longitudinal side thereof opposite said first mentioned longitudinal side for partially supporting said implement in a reclined position wherein said filler cap is facing generally upward to permit filling said tank with fuel for said engine.

*16. A portable power operated implement for trimming grass along the edge of a walk in a vertical cutting plane comprising:*

*a power assembly including:*

*an elongated support housing and a drive shaft rotatably disposed therein;*

*a power unit connected to one end of the support housing and coupled to rotate the drive shaft to form a power assembly;*

*a pair of hand grips connected at spaced points to the power assembly to facilitate an operator holding the power assembly with both hands and placing the other end of the support housing near the ground while in a comfortable standing position;*

*a grass cutting assembly connected to the lower end of the support housing and coupled to be driven by the drive shaft, the cutting assembly including:*

*a thin planar blade driven by the drive shaft, and rotatable at high speed sufficient to cut grass by impact, the blade being supported for rotation in a vertical plane of rotation which is disposed substantially parallel to the shaft housing when the power assembly is held by an operator in operative position;*

*protective shroud means disposed in the plane of rotation above the blade to protect the operator from flying debris kicked up by the high speed blade; and*

*depth of cut gauging means at a location removed from the path of rotation of the blade for engaging the surface of the walk while the blade is cutting along the edge of the walk to a depth below the surface of the walk, the gauging means being offset from the axis of rotation such that fine adjustments of depth of cut can be made by the operator during operation by raising and lowering the power assembly in a pivoting relation about said gauging means while the gauging means is resting on the walk.*

*17. The power operated implement of claim 16 wherein the depth of cut gauging means is adjustably movable generally within a vertical plane to compensate for operators of different height and/or wear of the blade.*

*18. The power operated implement of claim 17 wherein the gauging means is a wheel and is disposed generally between the point of cut by the blade and the power assembly.*

*19. A portable operated implement for trimming grass along the edge of a walk in a vertical cutting plane and including a power assembly having an elongated support housing and drive shaft rotatably disposed therein with a power unit connected at one end of the support housing and coupled to rotate the drive shaft to form a power assembly and a pair of hand grips at spaced points on the power assembly to facilitate an operator holding the power assembly with both hands and positioning said implement, and further including a grass cutting assembly attachment comprising:*

*means for coupling said attachment to said elongated support housing and said drive shaft therein;*

*a thin planar blade driven by the drive shaft, and rotatable at high speed sufficient to cut grass by impact, the blade being supported for rotation in a vertical plane of rotation which is disposed substantially parallel to the shaft housing when the power assembly is held by an operator in operative position;*

*protective shroud means disposed in the plane of rotation above the blade to protect the operator from flying debris kicked up by the high speed blade; and*

*depth of cut gauging means at a location removed from the path of rotation of the blade for engaging the surface of the walk while the blade is cutting along the edge of the walk to a depth below the surface of the walk, the gauging means being offset from the axis of rotation such that fine adjustments of depth of cut can be made by the operator during operation by raising and lowering the power assembly in a pivoting relation about said gauging means while the gauging means is resting on the walk.*

*20. The power operated implement of claim 19 wherein the depth of cut gauging means is adjustably movable generally within a vertical plane to compensate for operators of different height and/or wear of the blade.*

*21. The power operated implement of claim 20 wherein the gauging means is a wheel and is disposed generally between the point of cut by the blade and the power assembly.*

*22. A portable power operated implement comprising:*

*a tubular elongated support;*

*a power unit including a prime mover mounted on one end of said support;*

*a cutter head including a drive mechanism disposed at the opposite end of said support and drivably connected to a substantially vertically disposed rotary cutting blade;*

*drive shaft means extending within said support for drivingly interconnecting said power unit and said drive mechanism; and*

*adjustable surface engaging roller means mounted on said implement in the vicinity of said opposite support end at a location removed from the rotational path of*

*said blade, said roller means being adapted by a surface engagement to partially support said implement to control the cutting depth of said blade.*

*23. The invention set forth in claim 22 wherein:*

*said drive mechanism includes a housing mounted on said support, a shaft supporting said cutting blade and rotatably mounted in said housing for rotation about an axis substantially perpendicular to a central longitudinal axis of said drive shaft means, and gear means interconnecting said drive shaft means and said cutting blade shaft.*

*24. The invention set forth in claim 22 wherein:*

*said implement includes handle means adapted to be grasped by an operator in the normal position of operating said implement in such a way that the operator is remote from said cutting blade.*

*25. The invention set forth in claim 22 in which said roller means is offset to one side of the rotational path of said blade.*

*26. The invention set forth in claim 22 in which said roller means is adjustably settable for varying the cutting depth control of said blade.*

* * * * *